W. MÜLLER.
AUTOMOBILE HEADLIGHT CONTROL.
APPLICATION FILED MAR. 7, 1921.
1,410,587.
Patented Mar. 28, 1922.
3 SHEETS—SHEET 1.
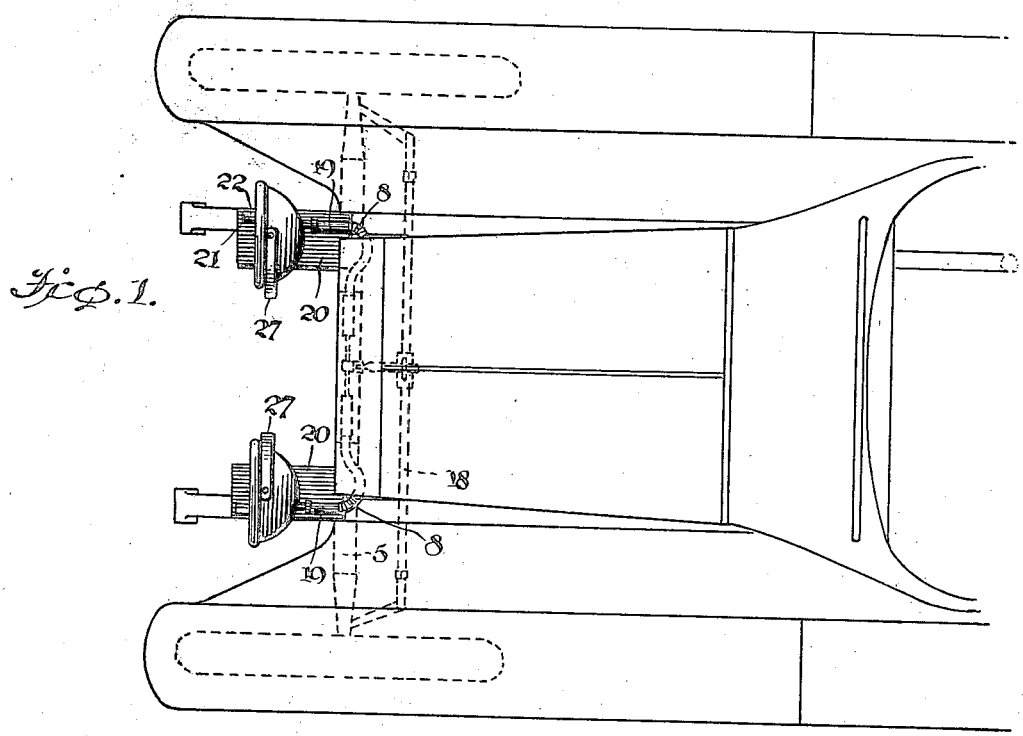
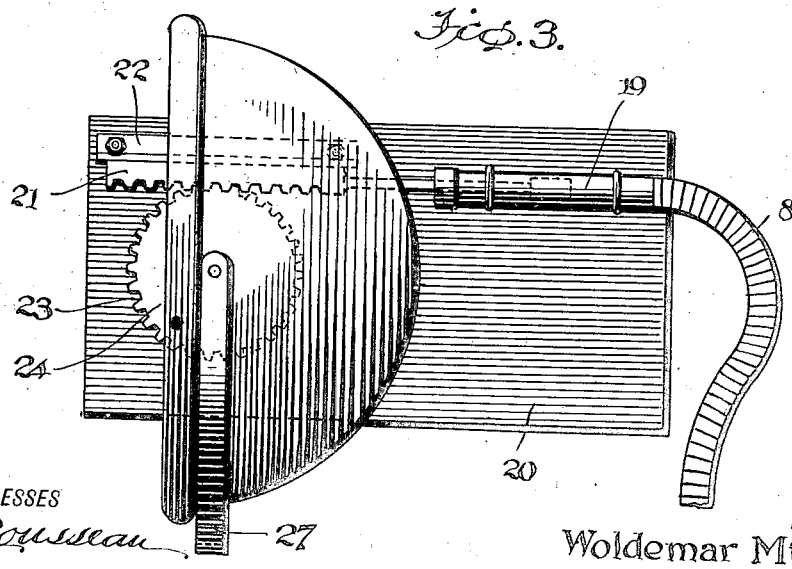
INVENTOR
Woldemar Müller, W. MÜLLER.
AUTOMOBILE HEADLIGHT CONTROL.
APPLICATION FILED MAR. 7, 1921.
1,410,587. Patented Mar. 28, 1922.
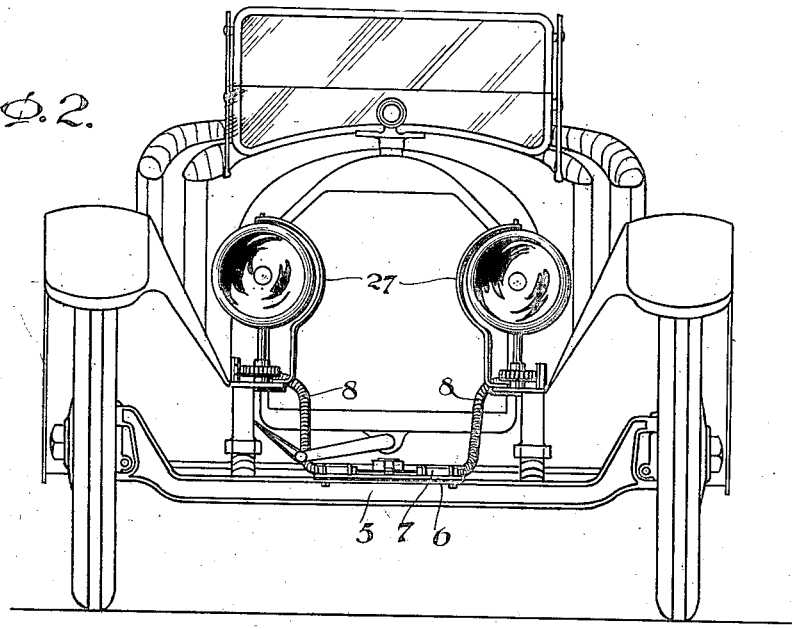
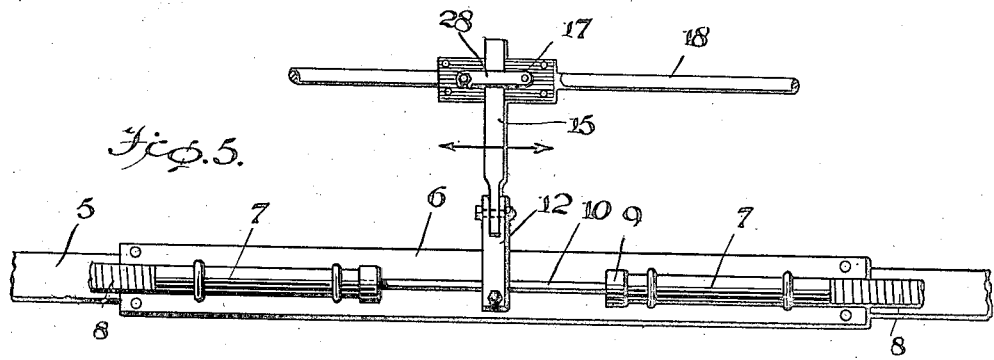
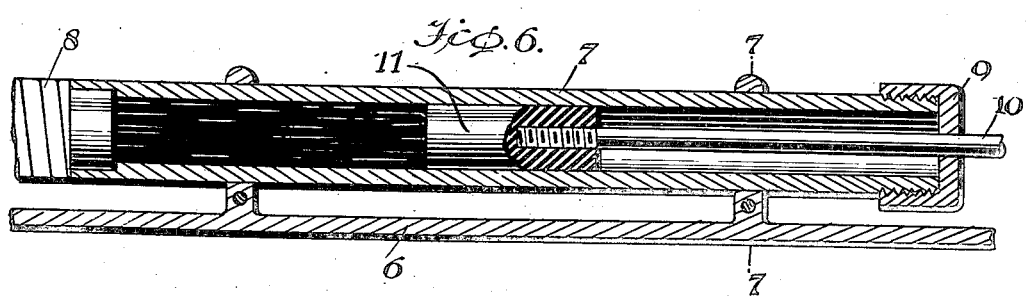
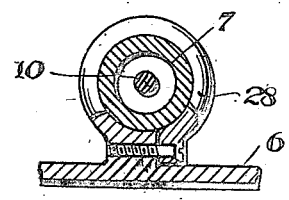
INVENTOR
Woldemar Müller,

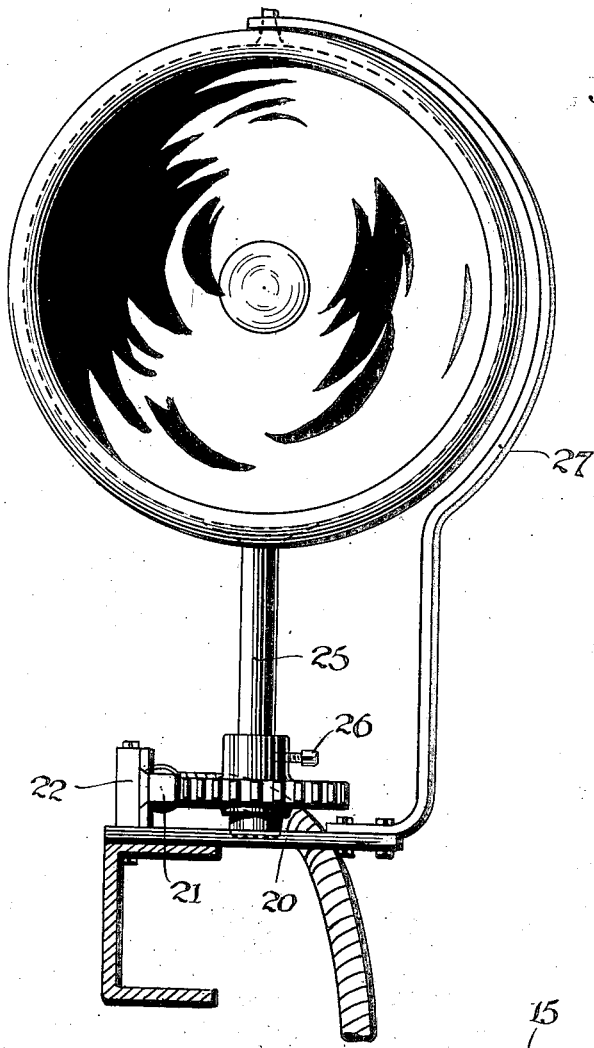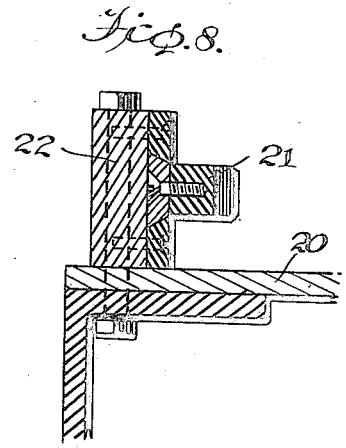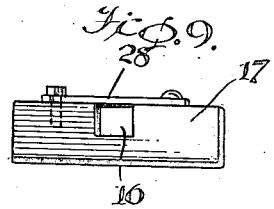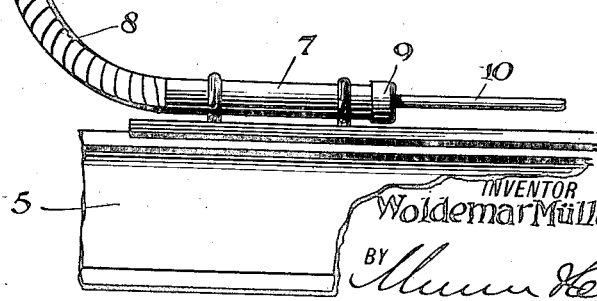

UNITED STATES PATENT OFFICE.

WOLDEMAR MÜLLER, OF HILO, TERRITORY OF HAWAII.

AUTOMOBILE HEADLIGHT CONTROL.

1,410,587.　　　　Specification of Letters Patent.　　Patented Mar. 28, 1922.

Application filed March 7, 1921. Serial No. 450,185.

*To all whom it may concern:*

Be it known that I, WOLDEMAR MÜLLER, a citizen of the United States, and a resident of Hilo, Territory of Hawaii, have invented certain new and useful Improvements in Automobile Headlight Controls, of which the following is a specification.

My invention relates to a new and useful improvement in automatic automobile headlights and more particularly to headlights operated by the steering mechanism so that the light will always point in the direction in which the car is moving.

An object of my invention is to provide means operable from the steering wheel of an automobile for turning the headlights of the machine so that the rays of light therefrom will be directed in a straight path forward of the course of travel of the machine.

Further objects of the invention is to provide movable headlights and operating means therefor which comprise a comparatively simple construction, readily applicable to any ordinary construction of automobile, easily actuated and positive in such action.

Other objects and advantages will be apparent as the nature of the invention is more fully described, reference being had to the accompanying drawings, in which—

Figure 1 is a top plan view of the forward part of an automobile, showing my attachment in its relative position thereon.

Figure 2 shows a view of the device taken from the front of the machine.

Figure 3 is an enlarged view looking down upon one of the lamps with the operating mechanism in outline.

Figure 4 is a view of one of the lamps showing manner of connection with the cylinder on the front axle of an automobile.

Figure 5 is a top plan view of the mechanism attached to the front axle and steering rod.

Figure 6 is a longitudinal section of one of the cylinders.

Figure 7 is a cross sectional view taken on the line 7—7 of Figure 6.

Figure 8 is a detail view of a cross section of the rack bar supporting frame.

Figure 9 is a side view of the attaching plate to the steering rod, and

Figure 10 is a detailed view of the connecting rod between the steering rod and fluid operated cylinder.

Referring to the drawings, the numeral 5 represents the front axle of an automobile, upon which is rigidly clamped in any convenient manner a supporting plate 6, upon which are also rigidly affixed two cylinders 7, oppositely disposed and relatively equidistant from the middle of the axle, said cylinders being of the same proportion and size and connected at their farther ends by a flexible hollow tube 8 and having their adjacent ends closed by a screw cap 9 provided with a central opening through which a piston rod 10 is slidably operated, said piston rod extending from within one cylinder through the cap to the opposite cylinder and having each end enclosed within its respective cylinder fitted with a piston 11 as and for the purposes hereinafter set forth.

The piston rod connecting the two cylinders has securely attached thereto, by any convenient means, a connecting rod 12, shown in detail by Figure 10 wherein for present purposes the bar is provided near its free end with an opening 13 receiving the piston rod, said end being slitted from the opening to the outer end of the bar to permit easy adjustment to the piston rod and being provided with a screw 14 to draw the splitted ends together and thus tighten the bar to the piston rod. The connecting rod has for its purpose to provide an actuating means for the piston, and is flexibly connected, as hereinafter described, to an adjoining rod 15, which in turn fits snugly within a groove 16, of the plate 17, better illustrated by Figure 9, which plate is rigidly clamped to the steering rod of the automobile.

The flexible connection between the rods 12 and 15 relieves the strain of any vibration and jarring motion from being transmitted between the axle and the steering rod, which could not be prevented in a rigid connection therebetween. The rod 15 is normally held seated in the groove of the plate 17 by means of a latch 28 which can readily be swung open and permits removal of the rod for adjustment of the device or for other purposes.

It will be seen that in the operation of the steering mechanism by the driver of the car, that any movement in either a right or left direction of the steering rod will be imparted to the pistons within their respective cylinders.

The flexible tube 8, leading from the outer end of the two cylinders and to the axle are secured to secondary cylinders 19, one on each side of the car and adjustably supported to the chassis by a plate 20. The secondary cylinders are of similar construction and of exact dimensions as the primary cylinders, having a piston rod attached to a piston slidably engaged therein, and having the opposite end formed into a rack bar 21, slidable within an undercut groove of a supporting rack 22, which is also affixed to the plate 20, said bar having its side engaging the groove of an increasing width and the groove of the support of an increasing depth, as illustrated by Figure 8. The purpose of this construction is to normally hold the teeth of the rack bar in alignment with the corresponding teeth of the pinion 24, which is fixedly secured to the lamp support 25, by means of a screw or other means 26.

The lamp support is seated in a recess of the plate 20 within which it is freely rotatable and supported in an upright position by means of a brace 27, the two front lamps of the car being similarly equipped.

In operation, the cylinders and tubes are filled with fluid, preferably whale oil, to insure better compression in the action of the pistons and less leakage between connections. The cylinder near the lamp is clamped on to the frame in such a manner that it may be moved closer to the lamp whenever through any cause the oil in the tube should be diminished. This cylinder has a vent hole at the bottom, without which it would be difficult to fill the tube or remove the piston, and this hole is closed when the cylinder is clamped on. When the cylinders and tubes are well filled, it will be noted that any movement imparted to the steering rod will in turn cause the pistons within the primary cylinders to move in the same direction and to the same degree. Thus the fluid in one primary cylinder will be slightly compressed within the tube against the piston in the secondary cylinder, forcing said secondary cylinder piston of said secondary cylinder outwardly and causing the rack to turn the lamp in the same direction as the front wheels of the machine, the extent of the rotation of the lamp depending upon the amount of movement imparted by the driver to the steering rod to turn said wheels. This action of compression by the piston of one primary cylinder causes an opposite action on the piston of the other primary cylinder and whereas the result of the compression on the one secondary cylinder would be to force the piston out and turn the lamp in the direction of the turn of the vehicle, the result on the other cylinder would be to cause a suction by the withdrawal of the piston and a displacement of the fluid, said suction tending to draw in the piston adjacent the second lamp and thus turn the lamp in an equal degree and in the same direction as the first lamp. This can readily be understood because of the fact that the secondary cylinder and rack bar transmitting the movement are oppositely arranged with respect to their respective lamps, the opposite movement of the primary cylinders being counter-acted by the opposite arrangement of the secondary cylinders with respect to the direction of the push or pull upon the lamp gear, thus resulting in a movement of both lamps in the same direction.

As clearly indicated by Figure 7, the primary cylinders are detachably supported by means of clamps 28, mounted on the plate 6, and they can in case of leakage of the fluid be released and placed in such a position as to maintain the fluid in tight compression between the pistons of the respective cylinders.

Having thus described my invention, what I claim as new is:—

1. In an automatic automobile headlight control, the combination with the steering rod of an automobile, a pair of rotatable headlights mounted on the front of the machine, a pair of opposed primary cylinders mounted transversely of the automobile at the front thereof, a common piston rod connecting said cylinders and slidably operative therein, flexible connecting means between said steering rod and piston rod arranged to reciprocate said piston rod, pistons secured to opposite ends of said piston rod and slidably engaged within said cylinders, flexible tubes connecting the rear end of each primary cylinder with a secondary cylinder, a piston slidably mounted in each of said secondary cylinders, means for compressing the fluid within said flexible tubes, a rack bar carried by each piston of said secondary cylinders, and a pinion engaged by said rack bar and secured to the headlights, all as and for the purpose set forth.

2. In an automatic automobile headlight control, the combination with the steering rod of an automobile, of a pair of rotatable headlights mounted on the front of the machine, a pair of primary cylinders provided with a single piston rod for said cylinders and slidably operative therein, flexible connecting means between said steering rod and piston rod arranged to transmit positive longitudinal movement of the steering rod to the piston rod, pistons secured to said piston rod and slidable within said cylinders, flexible tubes connecting the outer ends of the primary cylinders with adjacent secondary cylinders, means for compressing fluid within said flexible tubes, piston rods reciprocating within said secondary cylinders, a rack bar secured to each piston rod of said secondary cylinders, a pinion engaged by said rack bar and secured to the headlights, and means for adjusting the said secondary cylinders so as to maintain a constant pressure of the fluid, and at the same time retain the toothed bar in operative position with respect to the lamp.

3. The combination with the steering rod of an automobile, of a rotatable headlight mounted on the automobile, a pair of primary cylinders in tandem relation, a single piston rod coacting between said pair of cylinders and having a piston at each end, connecting means between said steering rod and the piston rod of said primary cylinders, said connecting means comprising two sections pivotally joined, one of which is rigidly secured to said piston rod and the other detachably mounted on the steering rod and arranged to transmit positive movement imparted to the steering rod and to take up vibrations between the connection.

WOLDEMAR MÜLLER.